United States Patent [19]

Thoma

[11] 4,260,102

[45] Apr. 7, 1981

[54] APPARATUS FOR PUNCHING SYMBOLS INTO TEMPLATE MATERIAL

[75] Inventor: Georg Thoma, Sauerlach, Fed. Rep. of Germany

[73] Assignee: Sanried Fr. Sander & Riedmaier GmbH & Co., Wuppertal, Fed. Rep. of Germany

[21] Appl. No.: 54,930

[22] Filed: Jul. 5, 1979

[30] Foreign Application Priority Data

Jul. 10, 1978 [DE] Fed. Rep. of Germany ....... 2830315
May 29, 1979 [DE] Fed. Rep. of Germany ....... 2921843

[51] Int. Cl.[3] ............................................... G06K 1/10

[52] U.S. Cl. ................................... 234/112; 234/115; 234/117; 101/19; 400/135

[58] Field of Search .................................... 234/42–45, 234/112, 121, 115, 117; 400/135, 136; 101/19, 128.4, 129

[56] References Cited

U.S. PATENT DOCUMENTS 3,770,093 11/1973 De Hart ........................ 101/128.4 X

*Primary Examiner*—J. M. Meister
*Attorney, Agent, or Firm*—Blanchard, Flynn, Thiel, Boutell & Tanis

[57] ABSTRACT

An apparatus for punching of symbols into template material with a punching tool. The punching tool has punching pins selectable by corresponding selector means. An operating mechanism, after selection of the punching pins by the corresponding selector means presses the punching pins through the template material in a grid arrangement characteristic of each symbol to be punched into the template material. The punching tool has several parallel rows of punching pins, of different punch sizes for punching of symbols in different sizes of lettering and/or types of lettering. The selector means selects and operates the punching pins of only one punching row, in any desired combination for punching of symbols according to a straight-line dot grid.

14 Claims, 14 Drawing Figures

APPARATUS FOR PUNCHING SYMBOLS INTO TEMPLATE MATERIAL

FIELD OF THE INVENTION

The invention relates to an apparatus for punching of symbols into template material with a punching tool, and more particularly to such an apparatus in which the punching tool has punching pins which, after selection by corresponding selector pins, are pressed through the template material by an operating mechanism in a grid arrangement characteristic of each symbol to be punched into the template material.

BACKGROUND OF THE INVENTION

For the illustration of symbols in grid form, among others, straight-line dot grids (row dot grids) and surface-dot grids (area-dot grids) are known.

In the case of straight-line dot grids, each symbol is composed of individual rows of grid dots applied one row after the other, by means of selectable punching pins attached from one single row of punching pins.

In the case of the surface-dot grid for punching of a symbol, there must be provided a set of punching pins which covers the entire symbol and from which the punching pins necessary to form the symbol are selected (compare German OS No. 22 23 305=U.S. Pat. No. 3,770,093).

Conventional punching apparatuses are known only for symbols of one size of lettering or one type of lettering. A selection of the size of lettering or of the type of lettering would, if at all, only be possible if the entire punching tool would be exchanged.

The basic purpose of the invention is to give a punching apparatus, the construction of which is simplified and can be changed with the lettering and punching size without effort.

SUMMARY OF THE INVENTION

The objects and purposes of the invention are met by providing an apparatus for punching of symbols into template materials with a punching tool having punching pins selectable by corresponding selector means. After selection of the punching pins by the selector means, an operating mechanism presses the selected punching pins through the template material in a grid arrangement characteristic of each symbol to be punched into the template material. In particular, the punching tool has several parallel rows of punching pins of different punch size for punching of symbols in different sizes of lettering and/or types of lettering. The selector means is arranged for selecting and operating the punching pins in any desired combination of the punching pins of only one punching row, for punching of symbols by means of a straight-line dot grid.

By selecting a certain punching pin row, symbols can be composed in the desired size of lettering using one straight-line dot grid. The input for the control of the punching apparatus corresponds to that for a row-grid control for one single row of punching pins. In spite of the multitude of possible sizes of lettering and types of lettering the mechanical input and the selector control of the sizes of lettering is only small.

The punching apparatus can be controlled either through a normal typewriter keyboard with an electronic control, through a data-processing system or by microprocessors. Aside from the symbol generators, the punching apparatus control also contains stores in which the distance between the individual symbols and also the line spacing can be programmed depending on the size of lettering. Through this the punching apparatus can be used in many ways.

The punching apparatus is advantageously continuously operated. For this purpose a punching plate for the punching pins is constantly moved back and forth through an electrically driven eccentric drive. Punching takes place not before the desired punching pins have been selected in the suitable punch row. The punching is controlled, for example, through a light barrier which is controlled by a control disk on the drive shaft of the eccentric drive of the punching plate.

In the case of such a dynamic punching operation very high punching forces can be applied, so that it is easily possible to satisfactorily punch strong template material, for example of thin aluminum sheet metal.

Further developments and advantages of the invention will be apparent from the following description, in which two exemplary embodiments are discussed more in detail in connection with the drawings.

DETAILED DESCRIPTION

Figure 1:
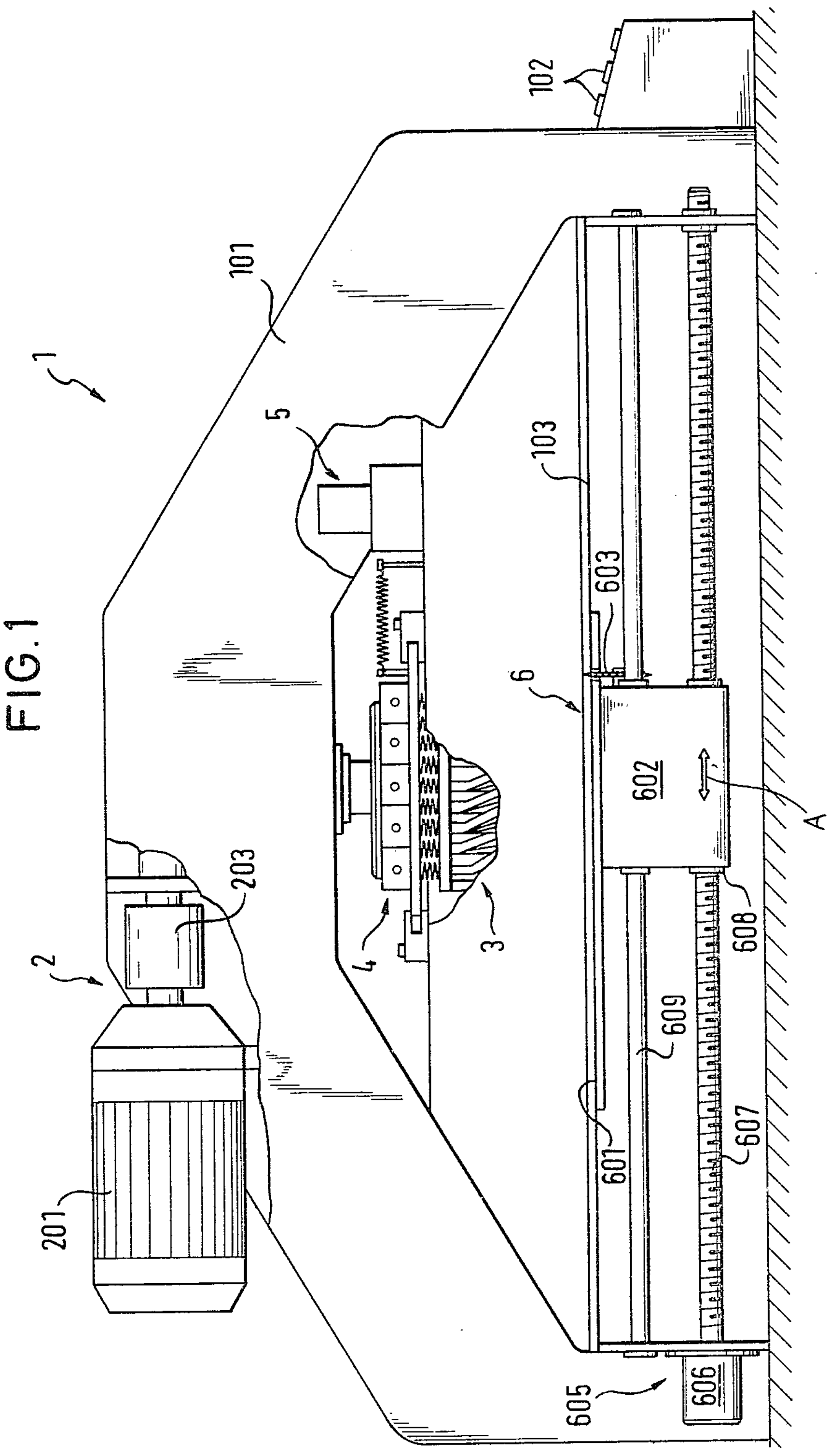
FIG. 1 is a side view of a punching apparatus according to the invention.

In the following description the same elements or elements that act in the same manner in the two embodiments disclosed are referred to by the same reference numerals.

A punching apparatus 1 (FIG. 1) for punching of templates from template material has a housing 101, an electric drive 2 with a motor for a punching plate and a punching tool 3. The housing 101 furthermore has a carriage 4 and an adjusting apparatus 5 for said carriage. A paper carriage 6 is connected to the housing. The paper carriage has associated therewith a feed mechanism for the template material and can itself be adjusted vertically with respect to said feed mechanism to adjust the spacing between the lines in the direction of the arrow A in FIG. 1. The punching apparatus has furthermore a keyboard 102, with which the symbols to be punched are fed into the control, not illustrated here, of the punching apparatus.

Figure 2:
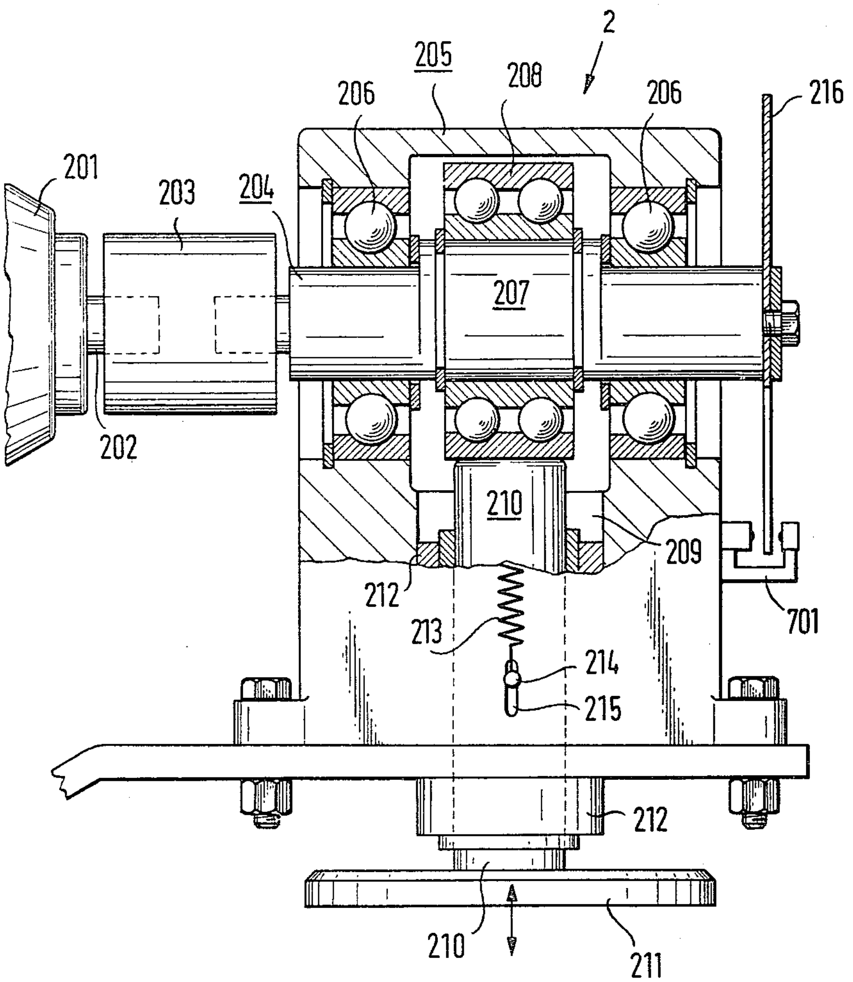
FIG. 2 is a partially broken view of a drive for the punching apparatus.

FIG. 2 illustrates the drive 2 of the punching apparatus. The drive has an electric motor 201, which is fixedly connected to the housing 101. The motor 201 has a drive shaft 202 connected to an eccentric shaft 204 through a coupling 203. The eccentric shaft 204 is rotatably supported on the two sidewalls of a mounting 205 fixed to housing 101. In cross section the mounting is approximately U-shaped and supports shaft 204 by means of two ball bearings 206. An eccentric 207 of circular cross section is secured to the eccentric shaft 204 in the free space of the mounting between the two ball bearings 206. The eccentric 207 is surrounded by a ball-thrust bearing 208. The mounting 205 has an opening 209 in its part below the eccentric shaft 204. The shank 210 of a punching plate 211 is guided transversely to the longitudinal direction of the shaft 202 by means of a ball bearing 212 in the opening 209.

The shank 210 is supported on the ball-thrust bearing 208 and is constantly pressed against same by a tension spring 213, which at its upper end is connected to the housing 101 and at its lower end to a crosspin 214 of the shank 210, wherein the crosspin 214 extends outwardly through a gap-shaped opening 215 of the mounting 205 fixed to the housing.

If the motor 201 is switched on, then the eccentric shaft 204 rotates at the speed of the motor and the punching plate 211 carries out a corresponding reciprocating stroke. A plate cam 216 is connected to the eccentric shaft 204 on the end thereof facing away from the motor 201. The plate cam coordinates the operation of the punching apparatus, as will be explained later.

Figure 3B:
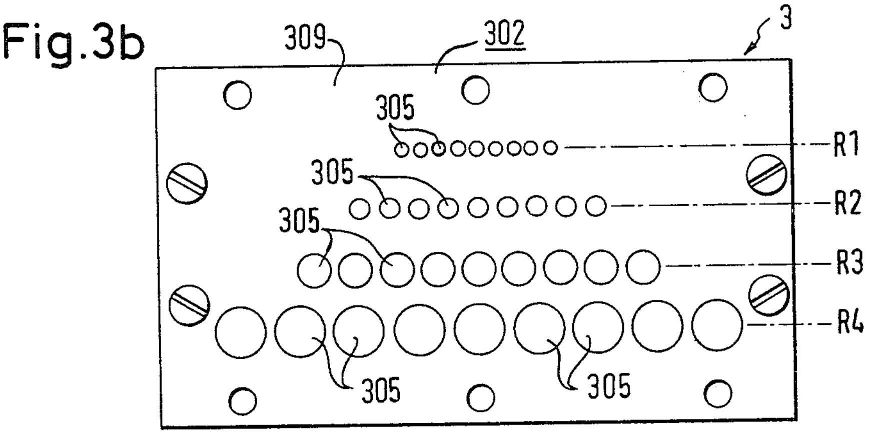
FIGS. 3*a–c* are respectively a side view, a bottom and a top view of a punching tool for a punching apparatus according to the invention.
Figure 3A:
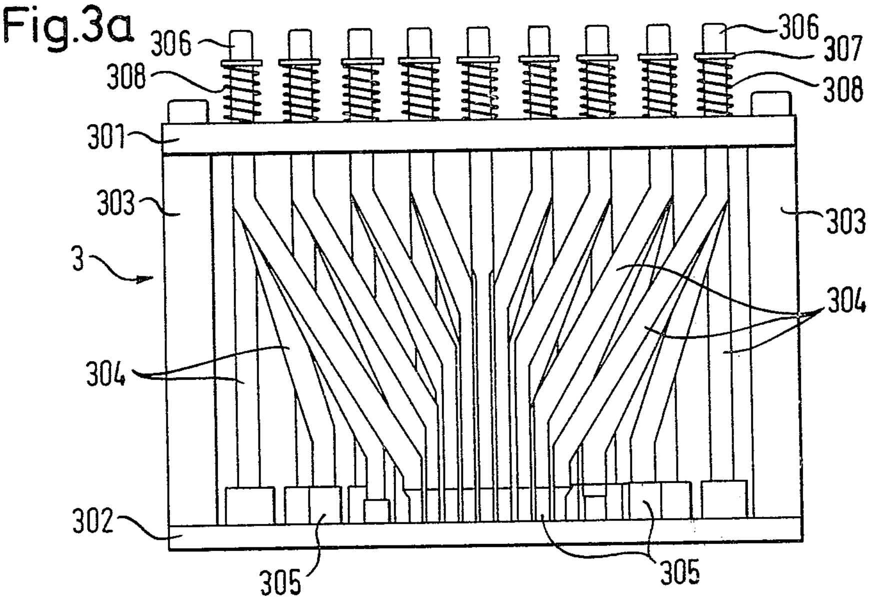

The punching tool 3 which is illustrated in FIG. 3 has an upper grid-guiding plate 301 and a lower punch-guiding plate 302, which are connected by two sidewalls 303 to which they are fixed by screws. Punching pins 304 extend between the grid-guiding plate and the punch-guiding plate in four rows R1 to R4 with nine pins in each row. The punching pin ends in the lower puncn-guiding plate, are the actual punches 305 for punching the template material and have a different diameter from row to row, wherein the punches with the largest diameter, namely the largest punch size, are shown in row R4. The spacing between the individual punches in the lower punch-guiding plate is kept small to subsequently form a highly legible symbol in the template material. Accordingly, the total length of each row is different, so that row R1 with the smallest punch has in this case approximately only ⅓ of the length of row R4.

Figure 3C:
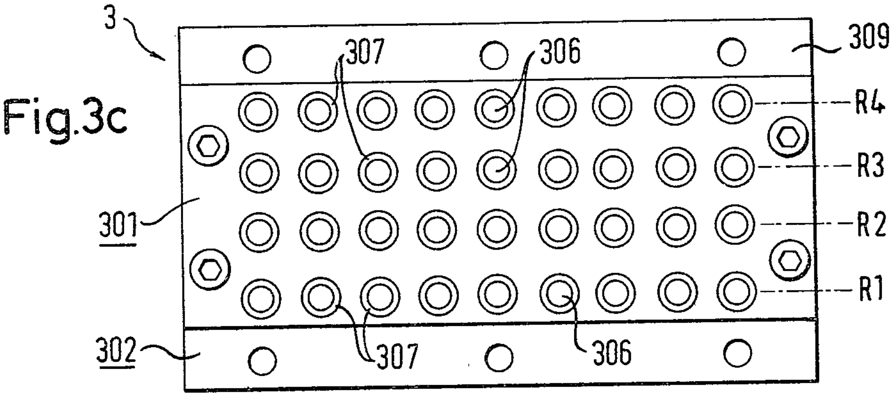

The upper control ends 306 of the punching pins 304 are guided through the grid-guiding plate 301 and are arranged in the same regular grid of four rows, and thus in nine columns as seen in FIG. 3*c*. The control ends 306 each have a collar 307, on which is supported the upper end of a pressure spring 308. The lower end of each pressure spring 308 rests on the grid-guiding plate.

The punching pins for the rows R1, R2 and R3 are bent in their center area between their control and punch ends, or punches, while the punching pins of the row R4 are straight. The punches of the punching pins 304 can thus be pressed to perforate the template material by means of an axial pressure onto their control ends of amount determined by the eccentric stroke out of the punching tool.

The punching tool 3 is fixed, by screws through a projection 309 of the lower punch-guiding plate 302, to the housing 101 of the punching apparatus. The punching tool 3 is located below the punching plate 211 of the drive 2, such that the punching plate 211 covers all four rows of the control ends 306 of the punching pins, which ends are opposite the punching plate 211, as seen in FIG. 4*b*.

Figure 4A:
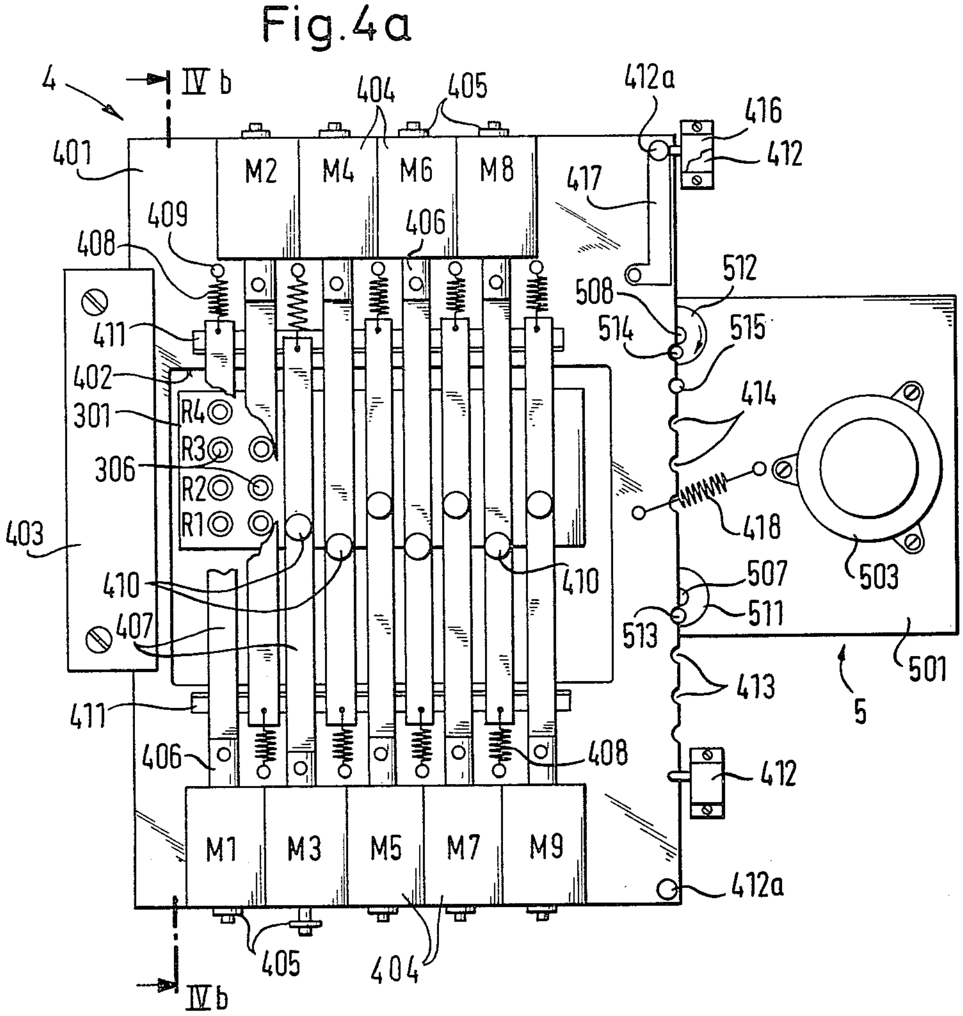
FIG. 4*a* is a top view of an adjustable carriage for adjusting the size of lettering in a punching apparatus according to the invention.
Figure 4B:
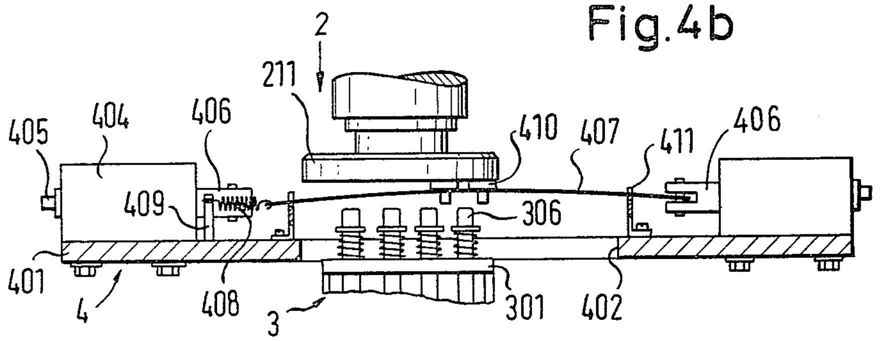
FIG. 4*b* is a side facing sectional view of the carriage of FIG. 4*a* in connection with the punching tool, substantially as taken on the line IVb–IVb of FIG. 4*a*.
Figure 4C:
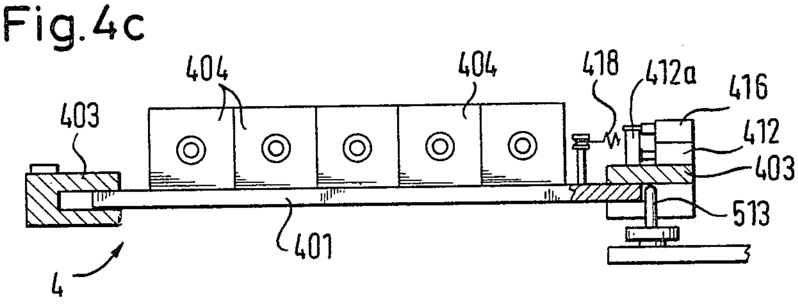
FIG. 4*c* is a partially broken view of the guideway of the carriage illustrated in FIGS. 4*a* and 4*b*, substantially as taken from the lower edge of FIG. 4*b*.

To control the punching pins, the carriage 4 is disposed between the punching plate 211 and the upper control ends 306 of the punching pins, as seen in FIGS. 4*a* to *c*. The carriage has a rectangular base plate 401, in the center of which is a rectangular recess 402. The base plate 401 is supported movably on its two longitudinal sides in respective guideways 403 fixed to housing 101. Five electromagnets 404 are secured side-by-side, with screws, on one narrow side of the base plate and four more electromagnets 404 are similarly secured on the opposite narrow side. For convenience in reference, the electromagnets 404 are individually identified at M1 to M9, whereby the five electromagnets on the one side of the base plate are identified by the uneven numbers and the four oppositely positioned electromagnets are identified by the even numbers. The electromagnets can each be controlled through a connection 405, of which only two are shown in the drawings. Each connection 405 is connected to the armature of the corresponding electromagnet, which in turn carries a fork 406. Each fork 406 receives and has secured thereto a leaf spring 407. Each leaf spring extends entirely over the recess 402 of the base plate 401 and is connected at its other end to one end of a tension spring 408. The other end of each tension spring 408 is suspended on a bolt 409 fixed to the base plate. When an electromagnet is not energized, its fork 406 is pulled out of the electromagnet to the extent permitted by an internal stop of the armature, as shown for all electromagnets except electromagnet M3. Electromagnet M3 is here shown in its controlled condition in which the armature has been pulled into the magnet and the tension spring 408 is tensioned. The electromagnets and the corresponding leaf springs 407 are arranged such that the leaf springs of the even-numbered electromagnets each lie between two adjacent leaf springs of the opposed, odd-numbered electromagnets. The distance between the center lines of two adjacent leaf springs corresponds exactly with the grid dimension of the grid-guiding plate 301, namely the distance between the centers of two adjacent control ends 306 of one grid row.

The leaf springs 407 have each a transmitting ram 410. The transmitting rams each have an upper base plate of diameter corresponding approximately to the width of the leaf spring 407. A mandrel is mounted on the base plate of each ram 410 and such mandrel extends through a hole in the leaf spring 407. The leaf spring 407 and the transmitting ram 410 are secured to one another, as seen in FIG. 4*b*, by any conventional means. In the position of the carriage 4 shown in FIG. 4*a*, and with all electromagnets in their rest position, the transmitting rams 401 are arranged so that the downwardly pointing ends of the rams 410 project from the grid-guiding plate 301 next to but laterally offset from the control ends 306 of the row R1. When all magnets are not energized, the transmitting rams 410 associated with electromagnets M1, M3, M5, M7 and M9 are thereby positioned between the rows R1 and R2, while the transmitting rams 410 of the oppositely positioned electromagnets M2, M4, M6 and M8 are on the other side of the row R1. If an electromagnetic is energized, as shown for magnet M3, then its transmitting ram is pulled far enough out of its inactive position, that it stands directly in alignment above a control end 306 in the grid row R1. By controlling suitable electromagnets 404, a desired combination of the transmitting rams 410 associated with this one row can be adjusted into alignment with the control ends 306. In order to fix the position of the leaf springs 407 and transmitting rams 410 sidewardly, the opposite ends of leaf springs 407 are guided by respective combs 411.

The position of the carriage 4 with respect to the adjacent punching tool 3, and the punching plate 211 of the drive, is shown in FIG. 4*b* which also shows the leaf springs slightly curved upwardly between the two combs 411 and the transmitting rams 410 in their rest positions offset to the side of the corresponding control ends 306. In its active punching position, the transmitting ram is aligned above a control end 306, with the lower ends of the transmitting ram elevated, as in FIG. 4*c*, slightly above the associated control end 306. A downward movement of the punching plate 211 thus moves down each inactively positioned one of the transmitting rams beside the control end 306 of the corresponding punching pin, and presses down an actively positioned transmitting ram onto the control end 306 of the corresponding punching pin, which in turn causes the latter punching pin to move in punching direction and to perforate the template material. In order to create a good contact between the punching plate and the individual transmitting rams, as above mentioned, on the one hand the leaf springs are prebiased upwardly (FIG. 4*b*), and on the other hand the transmitting rams 410 and punching plate 211 are each lightly magnetized, so that in the rest position illustrated in FIG. 4*b* the upper faces of the transmitting rams adhere to the underside of the punching plate 211.

In order to adjust the carriage 4 so that the transmitting rams 410 are associated with a different row of control ends 306, the adjusting mechanism 5 is provided, the latter being shown in FIG. 4*a* in engagement with the carriage 4. The carriage can be moved perpendicularly of the rows of the control ends 306 and the ones of the transmitting rams 410 by adjusting mechanism 5. The maximum movement is limited in a conventional manner by two limit switches 412 fixed to the housing 101, coacting with corresponding stops **412*a* fixed on the base plate 401**.

Figure 5:
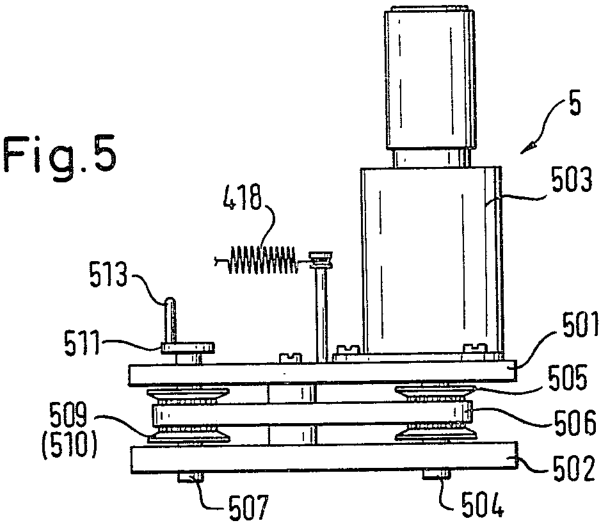
FIG. 5 is a fragmentary side view of an adjusting mechanism for the carriage for adjusting the size of lettering for the stamping apparatus.

The adjusting mechanism 5 (FIG. 5) has a base plate 501, which is screwed to the housing 101 of the punching apparatus. The base plate 501 extends in a plane parallel to the plane of the carriage 4. A bottom plate 502 is fixed by screws to the base plate 501. An electric motor 503 is mounted on the base plate 501. The drive shaft 504 of motor 503 extends vertically through the base plate 501 and is rotatably supported in the bottom plate 502. A toothed driving wheel 505 for a toothed belt 506 is secured on the drive shaft 504 between the base and bottom plates. On the side of the base plate 501, opposite the motor, two shafts 507 and 508 are supported. Shafts 507 and 508 carry respective toothed wheels 509 and 510 between the base and the bottom plates. The shafts 505, 507 and 508 are thus arranged in a triangle on the base plate 501, in which the shafts 507 and 508 lie on a line which in the installed position of the adjusting mechanism 5 is parallel to the leaf springs 407, and thus perpendicular to the rows R of the control ends 306, as seen in FIG. 4*a*. Regulator wheels 511 and 512 are fixed above the base plate 501 to the respective shafts 507 and 508. The regulator wheels carry respective follower pins 513 and 514. The described adjusting mechanism 5 is connected to the housing 101, so that the two follower pins 513 and 514 engage in corresponding notches 413 or 414 in the opposed edge of carriage base plate 401. The notches 413 are combined in a first group of four and the notches 414 in a second group of five notches. The position of the regulator wheels and follower pins shown in FIG. 4*a* is the initial and rest position of the adjusting mechanism 5 and thus of the carriage 4. The carriage 4 in this position is also locked by an additional holding pin 515 fixed to housing 101 and in FIG. 4*a* disposed in the second notch of the second group 414 directly behind the follower pin 514. The notches 413 and 414 in each group are spaced from one another, at a spacing corresponding exactly with the grid spacing between adjacent rows R of the punching tool 3. Also the spacing between the centers of each of the regulator wheels 511 and 512 and its respective follower pin, corresponds to half the grid spacing.

If the motor 503 of the adjusting mechanism is turned on, then the carriage 4 is advanced by the rotation of the follower pins 513 or 514 which engage the respective notches 413 or 414. It is hereby assumed that the direction of rotation of the regulator wheels is to the right, namely in the direction of the arrow on the regulator wheel 512 in FIG. 4*a*. The entire carriage 4 thus carries out a semicircular movement, until the third notch from the top of the group 414 in FIG. 4*a* rests on the holding pin 515. At this time the carrier pins 513 or 514 disengage from the notches and a disconnecting switch 416 for the motor 503 is operated by a shift rail 417, so that the motor 503 stops gradually. The transmitting rams 410 are now positioned so that the punching pins 304 of the next grid row R2 can be controlled.

If the motor 503 is again switched on, then the follower pins engage the next following notches, namely the second notch of the corresponding groups 413 and 414, and adjust the carriage 4 anew to the next grid row. During this adjusting, the carriage is pressed against the follower pins 513 and 514 by one or several tension springs 418, one end of which connects to the carriage and the other end of which fixedly connects to housing 101, here by means of a pin on the base plate 501 of the adjusting mechanism, to thus achieve an exact carriage advancement during said adjustment.

During the above-described adjustment of the carriage 4 by the adjusting mechanism 5, all electromagnets 404 of the carriage are at rest, such that the transmitting rams 410 are positioned in the inactive position above but sidewardly offset from the associated control ends 306 of the punching pins. During this adjusting movement, the inactively positioned transmitting rams 410 travel around said control ends also in a semicircle, and thus do not reach a position directly above the control ends. Accordingly, even though the punching plate 211 continues to be moved up and down during the adjusting movement, still no punching of the template material occurs.

The adjusting movement can of course occur several times, in order to move the carriage 4 from the position shown in FIG. 4*a*, which position is associated with the grid row R1, into a position associated with the grid row R4. The direction of movement of the carriage can thus be chosen freely. In the end positions of the carriage, as above described, the limit switches 412 are operated, which in turn causes the direction of the electric motor 502 of the adjusting mechanism to be reversed, so that when the electric motor 502 is again switched on, the carriage will run automatically from its position associated with the grid row R4 into a position associated with the grid row R3.

Figure 6:
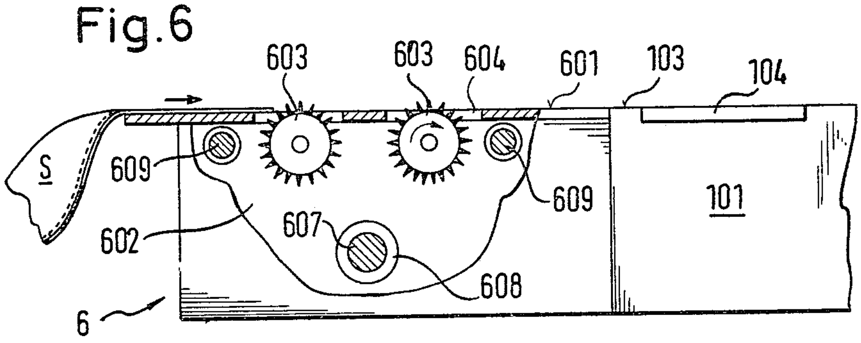
FIG. 6 is a side view of a paper carriage for the punching apparatus.

FIGS. 1 and 6 illustrate the paper carriage and the feed mechanism for the template material. The entire mechanism is as such known to the man of ordinary skill in the art and therefore only the most important parts are shown. The paper carriage 6 has a support surface 601 for template material. The support surface 601 of the paper carriage follows a like support surface 103 of the housing 101 of the punching apparatus. Support surface 103 is arranged directly below the punch-guiding plate 302 of the punching tool. A die plate 104 is recessed in support surface 103 directly below the punch-guiding plate 302, which die plate 104 has the same configuration as the punch-guiding plate 302. The punches 305 submerge during punching into the die plate 104. The punched-out waste material of the template material falls downwardly through suitable openings (not shown) in the die plate. In place of individual openings, the die plate 104 may also have four elongate column-like slots therethrough corresponding to the grid rows R1 to R4.

Figure 10:
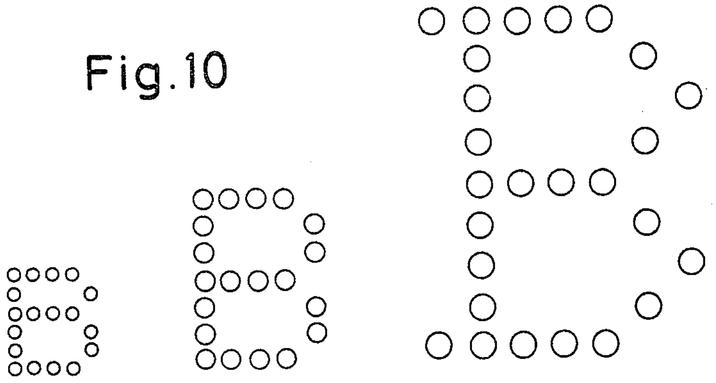
FIG. 10 illustrates some types of lettering and sizes of lettering which are possible with a punching apparatus embodying the invention.

The paper carriage 6 advances the template material in correspondence with the straight-line dot grid of a line of symbols to be punched and also moves the template material at right angles to such advancement to maintain the spacing between lines of symbols punched in the template material. For advancing the template material, a controllable electric stepping motor 602 with a double gearing is provided below the support surface 601. The output shafts of the gearing have fixed thereon two sprocket wheels 603, which partially extend through slots 604 in the support surface 601. The template material is perforated along one edge and is moved forwardly in the direction of the arrow in FIG. 6 by the sprocket wheels 603. The step width of the electric stepping motor 602 can be set and adjusted to the chosen size of lettering or punch size. For each punching step, the template material advance equals the distance between the centerpoints of two adjacent punch ends of the chosen punch size, as can be seen from the sample letters shown in FIG. 10.

To adjust the line spacing, the paper carriage 6 is adjusted by means of a screw drive 605, which includes an electric motor 606 and a screw 607. The screw drive is fixedly supported on housing 101. The threaded screw 607 is guided through a corresponding spindle nut 608, which is fixed in the housing of the stepping motor 602 which in turn is connected to the support surface 601. Along the direction of movement of the screw drive, the paper carriage 6 is guided by two bars 609 fixedly mounted on housing 101, which extend through corresponding guideways in the housing of motor 602.

Figure 7:
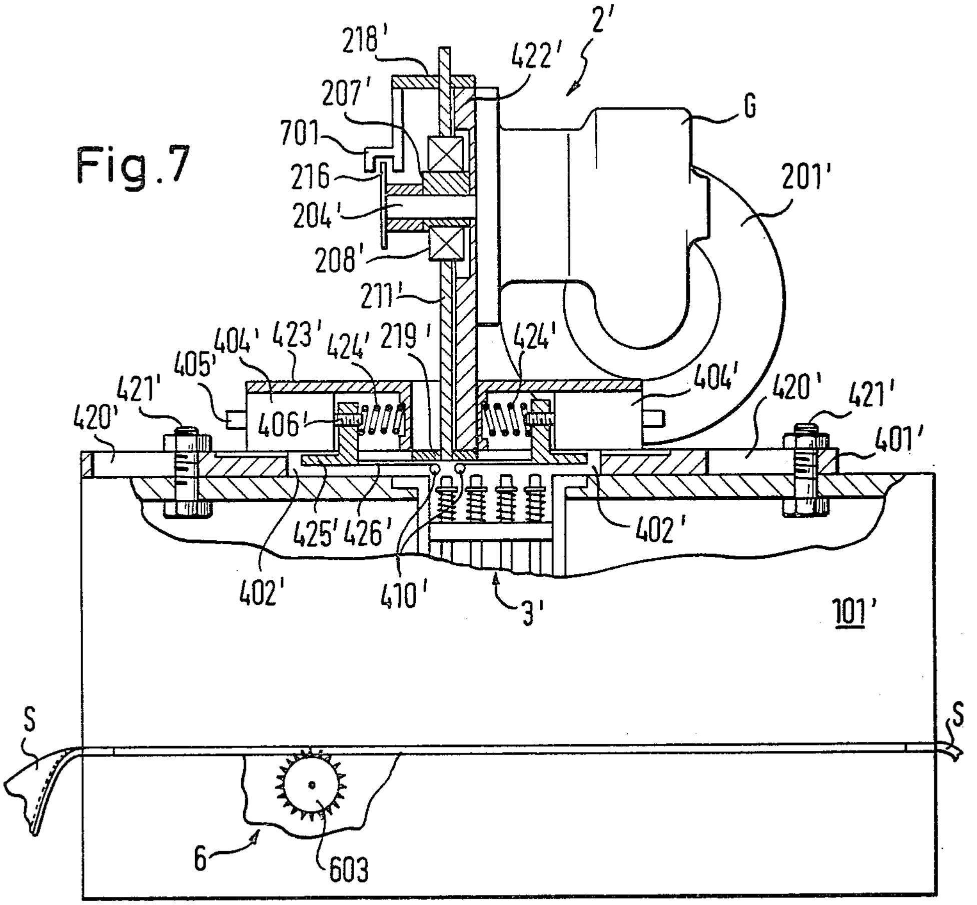
FIG. 7 is a partially broken side view of a second embodiment of a punching apparatus according to the invention.
Figure 8:
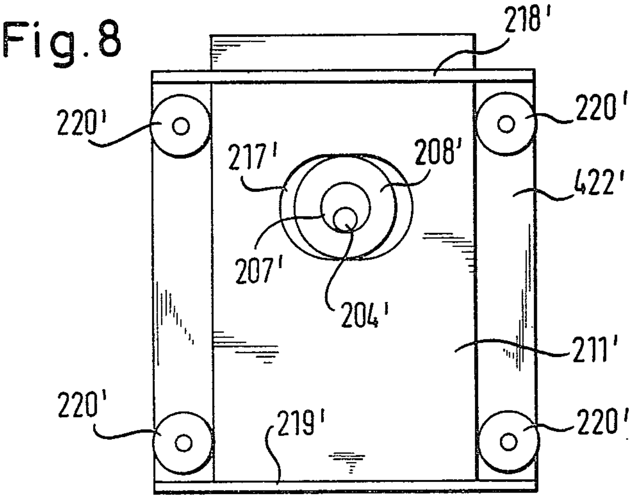
FIG. 8 is a fragmentary view of the drive of the punching apparatus according to FIG. 7.

FIGS. 7 and 8 illustrate a modified drive 2' for a further exemplary embodiment of a punching apparatus, the remaining parts of such punching apparatus being similar to the ones in the above-described embodiment. The drive 2' has again an electric motor 201', the drive shaft of which is connected to an eccentric shaft 204' through a miter gear (right angle bevel gear unit) G. The eccentric shaft is supported in the miter gear G through bearings (not shown) which absorb the occurring impact forces. An eccentric 207' of circular cross section is secured on the eccentric shaft 204' and has a ball-thrust bearing 208' around it. A plate-shaped punching plate 211' in turn extends around the thrust bearing 208', for which reason an opening 217' is provided in the punching plate. The punching plate 211' is guided at its upper end which projects above the thrust bearing 208' and at its lower end which faces the tool 3' in respective metal friction bearings 218' and 219' and is secured against lateral tilting by means of four guide rollers 220'.

The electric motor 2' with the above-described parts is secured on a base plate 401', which can be moved in turn like a carriage relative to the housing 101' of the punching apparatus and the punching tool 3'. In the here illustrated simple construction the connection between base plate 401' and housing 101' occurs through two bolts 421' which are guided in slotted holes 420'. The rectangular base plate 401', in its center has a rectangular recess 402' and carries in the area of said recess a wall 422' which leads vertically upwardly. The wall 422' fixedly supports the electric motor 201' and friction bearings 218' and 219'. Nine electromagnets 404' are secured on both sides of said wall 422' on sheet metal holders 423' which are L-shaped in cross section. On the right side of the wall 422', as seen in FIG. 7, there are arranged side-by-side five of said electromagnets, while on the opposite (left) side there are provided the remaining four electromagnets. The arrangement of said magnets corresponds to the one in FIG. 4*a*. The electromagnets are controllable each through a connection 405'. The armature of each electromagnet bears with a compression spring 424' on the sheet metal holders 423'. L-shaped carrier brackets 425' are connected outside of the magnet housing of the electromagnets 404' to the armatures thereof. One leg of each carrier bracket 425' snugly underlies the housing of the corresponding electromagnet 404'. A narrow spring-leaf strip 426' is connected to each said lower leg, and extends in the direction of movement of the magnet armature toward the punching plate 211'. In the rest position of the electromagnets, each spring-leaf strip 426' ends shortly before the punching plate 211' and carries a transmitting ram 410'. The transmitting rams 410' are small cylinders, the longitudinal axes of which extend parallel to the lower edge of the punching plate 211'. Thus in the rest condition of the electromagnets 404' there are positioned on the left side of the punching plate 211' at its lower end four such transmitting rams, and on the right side five. The transmitting rams 410' can be moved, by energization of the corresponding electromagnets, into the space between the lower edge of the punching plate 211' and the control (upper) ends of the punching pins in the adjacent row of punching tool 3', and thus into active punching position in which the respectively chosen punching pin can be pressed down by lowering of punching plate 211' for punching the template material.

The base plate 401' is so fastened to the housing 101' of the punching apparatus, that the punching plate 211' covers one row of punching pins, so that in this manner symbols of a selected type of lettering and size of lettering can be composed by formation of a line-dot grid. Should a different size of lettering be desired, then the base plate 401' is moved on housing 101 as permitted by its slotted holes 420' so that the punching plate 211' stands above the new row of punching pins. Since the electromagnets are also connected to the base plate 401', their relative position with respect to the punching plate 211' is maintained during such a movement, so that after fastening of the base plate 401' symbols with the new size of lettering can be punched.

The described punching apparatuses are controlled automatically, so that a symbol which is fed in for example through the keyboard 102 is punched automatically into the template material as a corresponding straight-line dot grid.

Figure 9:
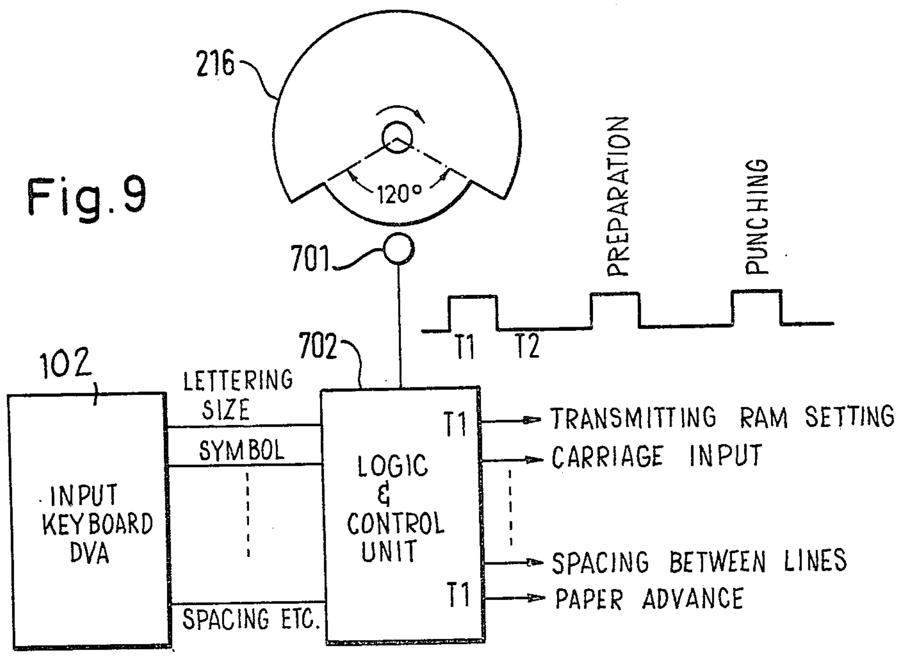
FIG. 9 illustrates a diagram of a control for the punching apparatuses embodying the invention.

A control for the above-described punching apparatuses is disclosed in FIG. 9. FIG. 9 substantially shows only a block diagram, because the components used for the control are known to persons of ordinary skill in the art and can be commercially obtained. The entire punching process is controlled through the already above-mentioned control plate 216 (FIG. 2) of the drive 2. Said control disk is a circular disk, from which a section of approximately 120° is cut out. A light sensor 701 cooperates with the control disk 216. During rotation of the control disk 216, the light input to light sensor 701 is normally interrupted and is only during the mentioned 120° not interrupted. The output signal of the light sensor 701 is thus zero during two-thirds of the period of rotation of the control disk 216 and is positive in the remaining third. The control disk 216 and the light sensor 701 are arranged such that the light sensor is always not interrupted when the punching plate 211 of the drive 2 is in a position around top dead center, namely in its position farthest from the upper ends of the transmitting rams 410 and 410'.

As soon as the punching apparatus is switched on, the electric motor 201 of the drive 2 starts to operate, so that the punching plate 211, as above described, carries out a continuous up and down movement. Accordingly, an output signal is produced by the light sensor 701, which output signal is illustrated schematically in FIG. 9 and which is positive over one-third of its period, during a time interval T1, and is zero over two-thirds, during a time interval T2. This signal is used as a control signal for controlling the punching apparatus. The time T1 is identified as the preparation time, the time T2 as the punching time. During the preparation time the selected transmitting rams 410 or 410' are moved into their active punching position below the punching tool 3, and at the same time the template material is moved forwardly one step. During the punching time T2 the ones of the punching pins 304 selected by the active ones of the transmitting rams 410 or 410' are pressed through the template material by downward travel of the punching plate 211 or 211'.

To manufacture a template, first the desired size of lettering is fed through the keyboard 102 to a logic and control unit 702. In the described punching apparatus with nine punching pins per row, generally a 5×6-, 5×7- or 7×9-grid is used. Since here four rows of different punch size exist, twelve different sizes of lettering could be chosen with this division. Usually, however, only eight to ten types of lettering are used, since the remaining types are only slightly different than the types used. FIG. 8 illustrates three examples of the letter "B", namely successively in a 5×6-grid, which was carried out by the punching pins of the row R1, in a 5×7-grid, by the grid row R2 and in a 7×9-grid by the grid row R3. Of course different types of lettering are also possible, for example types in which the lines of a symbol, which lines are composed of individual points, are constructed as duplicate, triplicate or quadruple dot rows. This is only a question of the symbol generators used for each symbol, which generators make available for each chosen lettering the matrix configuration to be punched. Thus it would also be possible to very exactly compose special symbols, which extend over the space for several normal symbols, out of individual grid dots. Particularly advantageous for all symbol combinations is the above-described advancement of the template material by means of sprocket wheels and a stepping motor, which makes it possible to very exactly advance the template material to a desired position.

After selecting the size of lettering and the type of lettering, the desired text is fed in. Corresponding with the matrix, or grid, configuration delivered by the symbol generators row for row corresponding with the applied row grid, control impulses are given to the electromagnets 404 or 404' of the carriage, so that the corresponding transmitting rams 410 or 410' are transferred into the active punching position and the text is composed corresponding with the line-dot grid. Forwarding of the control signals to the electromagnets is, however, only possible, when the light sensor 701 is not interrupted. Thus the light sensor controls a readiness input of the entire logic unit 702. This logic unit, after selecting the size of the lettering, also determines automatically the paper advance and the spacing between the lines. Also, the spacing between the individual letters is already being considered in the symbol generators.

The control for the template manufacture is identical in both exemplary embodiments.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for punching of symbols into template material with a punching tool, in which the punching tool has punching pins, which are pressed through the template material by an operating mechanism after selection by selector means in a grid arrangement which is characteristic for each symbol, the improvement comprised in that for punching of symbols in different sizes of lettering and/or types of lettering, the punching tool includes several parallel rows of said punching pins of different punch size, the selector means being arranged for selecting and operating the punching pins of only one punch row in any desired combination for punching of symbols according to a straight-line dot grid.

2. Punching apparatus according to claim 1, wherein the punching pins of each punch row have control ends opposite their punch ends, the control ends being located in rows in an even grid arrangement which is independent of punch size, said selector means comprising transmitting rams for one single row of control ends, said transmitting rams being movable from an inactive position in which they are offset sidewardly from the control ends of the punching pins, in any desired combination into an active punching position directly above the control ends of the punching pins, the operating mechanism including a common punching plate operable in the punching direction for punching by the chosen transmitting rams.

3. Punching apparatus according to claim 2, wherein the punching plate covers the control ends of all punching pin rows.

4. Punching apparatus according to claim 3, in which said selector means includes, for selecting different rows of punching pins, a carriage for the transmitting rams, the carriage being movable perpendicularly with respect to the grid rows of the control ends in steps corresponding with the row spacing, the carriage movement for said steps being on semicircular paths such that the transmitting rams, in their inactive positions, each travel in a semicircle around the control ends of the punching pins.

5. Punching apparatus according to claim 1, wherein said operating mechanism includes a punching plate which covers the entire length of a selectable punching pin row and transmitting rams introduceable in a selectable combination between punching plate and punching pins for transmitting the punching movement of the punching plate onto the punching pins.

6. Punching apparatus according to claim 5, including a common carriage movable with respect to the punching tool, the punching plate and the transmitting rams being arranged on said common carriage.

7. Punching apparatus according to claim 5, wherein the transmitting rams are arranged in their inactive position between two adjacent punching pin rows.

8. Punching apparatus according to claim 7, in which the said punching plate passes through between inactively positioned ones of the transmitting rams.

9. Punching apparatus according to claim 2, including, for selecting a certain row of punching pins, a carriage which receives the transmitting rams, which carriage can be moved with an adjusting mechanism comprising a Maltese-cross drive.

10. Punching apparatus according to claim 9, wherein said Maltese-cross drive includes two follower pins which are arranged on regulator wheels and are synchronously operated, said follower pins engaging notches at the edge of the carriage.

11. Punching apparatus according to claim 1, wherein the punching plate for all operating mechanism includes a punching pins, which punching plate is connected to a continuously operating eccentric drive, which periodically moves the punching plate back and forth in the punching direction.

12. Punching apparatus according to claim 11, in which said drive includes a drive shaft and a control disk connected to said drive shaft, said control disk having a control cutout portion, which corresponds with an angular area which lies around the top dead center of the punching plate and serves to produce a control signal for the punching operation.

13. Punching apparatus according to claim 12, including a light sensor for deriving said control signal for the punching operation, said control disk except in said area being arranged to interfere with application of light to said light sensor.

14. Punching apparatus according to claim 12, including, for the control of the punching operation, a logic circuit having symbol generators for the possible types of lettering and a preparation means for controlling the punching operation in dependency on the signal derived from the control disk.

* * * * *

UNITED STATES PATENT OFFICE
CERTIFICATE OF CORRECTION

Patent No. 4 260 102 Dated April 7, 1981

Inventor(s) Georg Thoma

It is certified that error appears in the above-identified patent and that said Letters Patent are hereby corrected as shown below:

Column 12, line 10; after "the" insert ---operating mechanism includes a---.

delete "operating mechanism includes".

line 11; delete "a".

Signed and Sealed this

*Twenty-ninth* Day of *September 1981*

[SEAL]

*Attest:*

GERALD J. MOSSINGHOFF

*Attesting Officer* *Commissioner of Patents and Trademarks*